United States Patent Office 2,717,853
Patented Sept. 13, 1955

2,717,853

CONTINUOUS DIALYSIS PROCESS FOR THE PRODUCTION OF CLINICAL DEXTRAN

Robert A. Shurter, Terre Haute, Ind., assignor to Commercial Solvents Corporation, Terre Haute, Ind., a corporation of Maryland No Drawing. Application July 7, 1954,
Serial No. 441,940

10 Claims. (Cl. 195—31)

My invention relates to the production of dextran and more particularly it relates to a continuous dialysis process for the production of clinical dextran.

Dextran is a polysaccharide material built up of glucose units condensed into long chains and generally having a very high molecular weight. It was found in Sweden that dextran was useful as a blood volume extender when the long chains of glucose units were assembled into molecules of an average molecular weight of about 75,000. Such a clinical material is the subject matter of U. S. Patent 2,437,518 by Gronwall and Ingelman issued March 9, 1948.

In the past, dextran has most usually been produced by cultivation of bacteria of the genus Leuconostoc on liquid nutrient media containing sucrose. The native dextran so produced generally has a molecular weight of the order of several millions. Clinical dextran is ordinarily obtained from the native dextran having the molecular weight of the order of several millions by hydrolysis of the high molecular weight material and fractionation of the hydrolyzed solution to obtain a relatively homogeneous clinical material with an average molecular weight of about 75,000.

It has recently been found that in the previously known processes, the bacteria of the genus Leuconostoc actually produced an enzyme, dextransucrase, when cultivated on liquid nutrient media containing sucrose and that the enzyme in turn produced dextran from sucrose. The production of dextransucrase and its utilization in the production of dextran is described by Koepsell et al., Journal of Bacteriology, volume 63, page 293 (1952); Tsuchiya et al., Journal of Bacteriology, volume 64, page 521 (1951); and in U. S. Patent 2,673,828 by Koepsell et al.

It is well known that in the production of dextran by the action of the enzyme dextransucrase on sucrose, there is produced, as a by-product, considerable quantities of fructose. Recent work by Koepsell et al., Journal of Biological Chemistry, volume 200, page 793 (1953), indicates that fructose as well as glucose, maltose, isomaltose, galactose, low molecular weight dextran, etc. act as primers or glucosyl acceptors when present in the sucrose solution during production of dextran employing the enzyme dextransucrase. These so-called primers are capable of initiating new dextran chains and capable of accepting glucosyl radicals which are the building units in the production of the long chain dextran molecule.

Previous processes for production of dextran using primers were characterized by the fact that no matter what primer or mixture of primers was added to the sucrose solution, fructose, also a primer, was continually produced throughout the processing period and thus the production of dextran was taking place in the presence of continually increasing quantities of fructose primer. The result of this was that the continually increasing quantities of primer were causing the initiation of new dextran chains rather than causing the formation of longer dextran chains from those already initiated. The result was production of dextran containing very large quantities of low molecular weight material, it being well known that such material is unsuitable for use as a blood volume extender because the low molecular weight material diffuses from the blood stream in a very short time.

I have now discovered a process for producing dextran by the action of the enzyme dextransucrase in a sucrose solution whereby I can obtain dextran of a uniform molecular size including dextran suitable for clinical use as a blood plasma expander without the production of excessive quantities of low molecular weight material. My new process is continuous, economical, and relatively simple to operate. Furthermore, my new process for the production of dextran makes it possible to recover by-product fructose which is a valuable material for intravenous carbohydrate feeding.

My new process consists essentially of continuously passing a solution of dextransucrase either with or without the addition of a primer such as maltose, isomaltose, fructose, low molecular weight dextran, etc. over one side of a dialysis membrane and continuously passing a sucrose solution in countercurrent relation to the dextransucrase solution over the opposite side of the dialysis membrane. By carrying out my process in any of the various types of continuous dialyzing apparatus known to the art, I am able to obtain a high concentration of primer in the dextransucrase solution at the beginning of the process and as the process continues and the dextransucrase solution moves through the dialyzing apparatus, the primer material continually dialyzes into the countercurrently flowing sucrose solution which gradually becomes more depleted in sucrose content through continual dialysis of the sucrose into the dextransucrase solution. Thus I have relatively high concentration of primer in the dextransucrase solution at the beginning of the process when the initiation of many dextran chains is desired and a gradually decreasing amount of primer in the dextransucrase solution as the process continues when it is more important to extend the dextran chains already initiated rather than to initiate new dextran chains.

A suitable dialyzing apparatus in which I can carry out my new process is described in U. S. Patent 2,107,805 by A. O. Russell. This type of dialyzer consists of a series of upright skeleton frames clamped together in a press in liquid-tight engagement having dialysis membranes disposed between the frames, the apparatus being much like a filter press in appearance. In this type of apparatus the dextransucrase and primer solution is circulated through alternate frames as the sucrose solution is passed in the opposite direction through the other frames. Thus the sucrose dialyzes into the dextransucrase solution and the primer dialyzes out of the dextransucrase solution into the continuously depleted sucrose solution. When such an apparatus as just described above is employed, the number of frames i. e. the length of the path traversed by the two solutions and the rate of flow of the dextransucrase and sucrose solutions should be adjusted to provide a cycle sufficient for the maximum production of dextran suitable for clinical use as a blood plasma expander. Generally, I prefer to employ about a 12-hour cycle in which period I have found that the dextransucrase produces a maximum amount of dextran of suitable size as indicated above.

In carrying out my new process, I prefer to employ a dextransucrase solution containing at least about 100 units per ml. of dextransucrase. A dextransucrase unit is defined as that amount of dextransucrase which will convert 1 mg. of sucrose to dextran in 1 hour at 30° C. and pH 5.0 as determined by an increase in reducing power (the liberation of 0.52 mg. of reducing power) calculated as fructose employing the method of Somogyi, Journal of Biological Chemistry, volume 160, page 61 (1945).

An important feature of my new process lies in the fact that I can recover the enzyme, dextransucrase, from the dextran product solution and re-use it in the process.

In the conduct of my process, I employ a temperature ranging from about 20 to about 40° C., it being known that the enzyme is inactivated at a temperature of 45° C. I prefer to employ a temperature ranging from about 25 to 35° C. Because of the instability of dextransucrase at pH 6.5 and above, I employ a pH for my process ranging from 4.0 to 6.0, generally buffering the solution at about pH 5.0.

The amount of primer which I employ in my new process is a factor to be adjusted upon the establishment of the other conditions. Generally, I employ about 2% by weight of primer in the dextransucrase solution; however, it is obvious that this amount can be raised or lowered depending upon the character of the product since if the product contains excessive amounts of low molecular weight dextran, an excess of primer material would have been used. On the other hand, if the dextran product had an average molecular weight above that desired for material suitable for clinical use as a blood plasma expander, it would be apparent that an insufficient amount of primer had been employed, not enough dextran molecules having been initiated and those that were initiated having been permitted to become too large.

The sucrose solutions which I employ in my process can be of varied concentration depending upon the rate of flow of the solution through the dialyzer and the molecular weight product desired. Generally, I prefer to employ a sucrose solution having a concentration of about 10% by weight since I have found that with such a solution I can obtain production of good yields of dextran of a molecular size suitable for clinical use as a blood volume extender.

It is apparent that many variations of my new process will be obvious to those skilled in the art. For example, instead of having the dextransucrase and sucrose solutions flowing past each other on opposite sides of one dialysis membrane at a time as is the case in the above-described dialyzer, I can sectionalize the dialyzer into groups of three frames separated by two dialysis membranes and then pass the dextransucrase solution between the two membranes with the sucrose solution being divided into two portions which are passed on each side of the dextransucrase solution. It is also apparent, that I can operate my process by passing the dextransucrase solution countercurrent to a water flow, injecting limited amounts of sucrose directly into the dextransucrase solution at intervals throughout the length of the dialyzer. In such instance, I would inject amounts of sucrose directly into the dextransucrase solution such that each portion of sucrose added was used up prior to the addition of a subsequent portion of sucrose directly into the dextransucrase solution. Such a procedure would be advantageous since it would insure that at no time was there a large amount of sucrose present and thus it would be impossible for large amounts of fructose to accumulate and thus initiate new dextran chains. Also I would not suffer from large losses of sucrose by dialysis from the dextransucrase stream. I can also operate my process so as to remove fructose solution from the stream into which it dialyzes at intervals throughout the process and thus continually create a favorable condition for dialysis of fructose from the stream in which dextran is being produced.

It is also obvious that I can employ different types of dialyzers than that described above. For example, I can employ a tube-type dialyzer consisting of a jacketed tubular shaped dialysis membrane. In using such a dialyzing apparatus, I introduce the dextransucrase solution into the dialysis tube and introduce the sucrose solution at the opposite end into the jacket. In the operation of my process employing such a dialyzing apparatus, the fructose dialyzes from the dextransucrase solution in the tube into the sucrose solution, while the sucrose in the solution introduced into the jacket at the opposite end from which the dextransucrase solution was introduced to the dialysis tube, dialyzes into the dextransucrase solution in the dialysis tube, the sucrose solution becoming depleted of sucrose as it flows toward the end of the dialyzer where the dextransucrase is introduced.

It will also be obvious to anyone skilled in the art that while I can produce dextran of a molecular size suitable for use as a blood plasma expander by means of my new process, I can also produce dextran of any desired molecular size up to very large molecules having a molecular weight of the order of several millions. For example, I can produce dextran of very low molecular weight by employing a short cycle of operation and a relatively large amount of primer in the dextransucrase solution introduced to the process thus enabling the initiation of many dextran molecules which are not permitted to become of large size due to the relatively short period of time in which the process is operated. On the other hand, I can produce dextran of a very large molecular size, by increasing the length of the process cycle and employing relatively small amounts of primer, the extreme case being the addition of no primer thus reducing the number of new dextran molecules initiated and permitting those dextran molecules which are initiated to become of increased size.

As an example of the operation of my new process, an aqueous solution of 2% by weight fructose containing 100 units of dextransucrase per ml. was continuously introduced into one end of a plate and frame type dialyzer at a temperature of 30° C., the pH of the solution being buffered to 5.0 with potassium pyrophosphate. Into the opposite end of the dialyzer, a ten per cent by weight solution of sucrose was introduced such that the sucrose solution passed in countercurrent relation to the dextransucrase solution, the two solutions being separated by a dialysis membrane. From the end of the dialyzer opposite that where the dextransucrase solution was introduced, there was withdrawn a relatively pure solution of dextran of moderate molecular weight while from the end of the dialyzer opposite that where the sucrose solution was introduced, there was withdrawn a relatively pure solution of fructose.

Now having disclosed my invention, what I claim is:

1. A continuous process for the production of dextran of uniform molecular size which comprises continuously passing a solution of dextransucrase and a solution of sucrose in countercurrent relation on opposite sides of a dialysis membrane, withdrawing the dextransucrase stream as a solution of dextran of uniform molecular size and withdrawing the sucrose stream as a solution primarily of fructose.

2. A continuous process for the production of dextran of uniform molecular size which comprises continuously passing a solution of dextransucrase and a solution of sucrose in countercurrent relation on opposite sides of a dialysis membrane, dialyzing sucrose into the dextransucrase stream and dialyzing fructose formed in conversion of sucrose to dextran into the depleted sucrose stream, withdrawing the dextransucrase stream as a solution of dextran of uniform molecular size and withdrawing the sucrose stream as a solution primarily of fructose.

3. A process for the production of dextran of uniform molecular size which comprises continuously dialyzing sucrose into a solution of dextransucrase and continuously dialyzing fructose from the solution of dextransucrase such that the dextransucrase solution has a relatively high concentration of fructose and a relatively low concentration of sucrose in the initial stages of the process and has a decreased concentration of fructose and an increased concentration of sucrose in the final stages of the process, such sucrose content being essentially all converted to dextran of uniform molecular size.

4. A process for the production of dextran of uniform molecular size which comprises continuously passing a solution of dextransucrase and water in countercurrent relation on opposite sides of a dialysis membrane, incrementally adding sucrose to the dextransucrase solution at various stages throughout the process, each sucrose increment being essentially all converted to dextran before addition of any further increments, continuously dialyzing fructose from the dextransucrase stream into the water stream, the said dextransucrase stream being withdrawn as a solution of dextran of uniform molecular size.

5. A process for the production of dextran of uniform molecular size which comprises incrementally adding sucrose to a solution of dextransucrase and continuously dialyzing fructose from the solution of dextransucrase such that the dextransucrase solution has a relatively high concentration of fructose in initial stages of the process and has a decreased concentration of fructose in the final stages of the process, each sucrose increment being essentially all converted to dextran before addition of any further increments, the sucrose added being essentially all converted to dextran of uniform molecular size.

6. A process for the production of dextran of uniform molecular size which comprises continuously dialyzing sucrose into a solution of dextransucrase and dextran primer and continuously dialyzing fructose from the solution of dextransucrase such that the dextransucrase solution has a relatively high concentration of primer and a relatively low concentration of sucrose in the initial stages of the process and has a decreased concentration of primer and fructose and an increased concentration of sucrose in the final stages of the process, such sucrose content being essentially all converted to dextran of uniform molecular size.

7. The process of claim 6 wherein the dextran primer is fructose.

8. The process of claim 6 wherein the dextran primer is isomaltose.

9. A continuous process for the production of dextran of uniform molecular size which comprises continuously passing a solution of dextransucrase and dextran primer and a solution of sucrose in counter-current relation on opposite sides of a dialysis membrane, dialyzing the sucrose into the dextransucrase stream and dialyzing fructose into the depleted sucrose stream, withdrawing the dextransucrase stream as a solution of dextran of uniform molecular size and withdrawing the sucrose stream as a solution primarily of fructose.

10. A continuous process for the production of dextran of uniform molecular size which comprises introducing a solution of dextransucrase and fructose into a continuous dialyzer, introducing sucrose solution into the opposite end of the continuous dialyzer such that the streams pass in countercurrent relation on opposite sides of a dialysis membrane, removing a solution of fructose in relatively high concentration and sucrose in relatively low concentration from the opposite end of the dialyzer from the point of introduction of the sucrose solution.

References Cited in the file of this patent

UNITED STATES PATENTS 2,660,551    Koepsell _____ Nov. 24, 1953

OTHER REFERENCES

Tsuchiya et al.: Jour. Am. Chem. Soc., February 5, 1953, pages 757–758.